(12) United States Patent
Prabhakaran

(10) Patent No.: US 7,355,586 B2
(45) Date of Patent: Apr. 8, 2008

(54) METHOD FOR ASSOCIATING MULTIPLE FUNCTIONALITIES WITH MOUSE BUTTONS

(75) Inventor: Satish Prabhakaran, Bangalore (IN)

(73) Assignee: General Electric Co., Schenectady, NY (US)

( * ) Notice: Subject to any disclaimer, the term of this patent is extended or adjusted under 35 U.S.C. 154(b) by 140 days.

(21) Appl. No.: 10/402,081

(22) Filed: Mar. 28, 2003

(65) Prior Publication Data

US 2004/0189592 A1   Sep. 30, 2004

(51) Int. Cl.
*G09G 5/08* (2006.01)
*G06F 3/048* (2006.01)
(52) U.S. Cl. .................. 345/163; 715/769; 715/779; 715/811
(58) Field of Classification Search ............... 345/156, 345/160, 163; 715/811–812, 711, 769, 779
See application file for complete search history.

(56) References Cited

U.S. PATENT DOCUMENTS

| 5,644,737 A * | 7/1997 | Tuniman et al. ............ 715/810 |
| 6,466,197 B1* | 10/2002 | Kim et al. .................. 345/156 |
| 2002/0057299 A1* | 5/2002 | Oren et al. ................. 345/825 |
| 2002/0158915 A1* | 10/2002 | Rowell et al. ............. 345/835 |
| 2003/0038847 A1* | 2/2003 | Duvel et al. ............... 345/810 |
| 2003/0052866 A1* | 3/2003 | Sakaguchi ................. 345/173 |
| 2004/0001094 A1* | 1/2004 | Unnewehr et al. ......... 345/769 |
| 2004/0056896 A1* | 3/2004 | Doblmayr et al. ......... 345/769 |

* cited by examiner

*Primary Examiner*—Richard Hjerpe
*Assistant Examiner*—M. Fatahiyar

(57) ABSTRACT

The present invention is method for simultaneously associating different functionalities with different mouse buttons. The method of the present invention also provides an enhanced toolbar (60) that displays the mouse key (84, 85, 86) associated with a particular tool (63) and permits the user to change the tool designation of a mouse key (84, 85, 86) by dragging and dropping the tool identifier (61, 62) on another tool (63) in the toolbar (60), or in another toolbar (60).

20 Claims, 7 Drawing Sheets

METHOD FOR ASSOCIATING MULTIPLE FUNCTIONALITIES WITH MOUSE BUTTONS

BACKGROUND OF THE INVENTION

The present invention relates to computers and peripheral equipment for computers. More specifically, it relates to a method for associating multiple functionalities with mouse buttons.

The toolbar that is used in many familiar software applications is really a directory of tools that are used to perform specific operations for those applications. In order to use, or apply the tool, the user must select the tool from the tool bar and then apply it using the left mouse button. Basically, the tools fall into two general categories, "state" tools and "action" tools. State tools retain their state once they are selected. For example, the "line" tool in the drawing toolbox remains selected for repeat use. Action tools perform one operation and do not retain their state. An example of a typical action tool is the flip and rotate tool that is available in most drawing software toolbars.

BRIEF SUMMARY OF THE INVENTION

Generally, the user must select a state tool from the toolbar. Normally, the user is only permitted to select one tool from the tool bar using the left mouse button. In other words, it is not possible to associate more than one functionality with the mouse buttons at a time. It is also not currently possible to change the tool functionality associated with left mouse button when the application is launched.

Many operations require extensive use of a mouse. Frequently, use of a mouse is necessary so that the user can pick from all of the functions that the program has to offer. Unfortunately, despite the breadth of functions most programs offer, few people use more than a few functions. Frequently, those people are frustrated that they have to repeatedly use the mouse to select between a very few functions. For example, two common functions used while drawing are the line function and the arc function. What is needed is a simple way to provide those functions at a person's fingertips.

A method for easily changing the functions associated with the mouse keys is also required. Frequently, as one enters different stages of a project, different keys become more important. For example, while in the drawing stages, the line and arc commands may be most important. In the editing stage, erasing and coloring functions may be most important.

Therefore, there is a need to associate two different functionalities with two different mouse buttons at one time. There is also a need to limit the amount of user inputs required to configure the different functionalities. The method of the present invention associates two mouse buttons with two different functionalities and provides a method of reconfiguring the functionality that requires just one mouse click. The method of the present invention also provides a visual indicator on the toolbar of the configuration of the mouse buttons.

DETAILED DESCRIPTION OF THE INVENTION

The method of the present invention uses the drag and drop mechanism of the typical computer mouse to associate two different functionalities with two different mouse buttons. Specifically the present invention assigns each tool on the toolbar with a unique identifier, such as an integer that identifies the tool in the database. Similarly, the left and middle mouse buttons will also be assigned unique identifiers that are mapped to them in the database.

Figure 1:
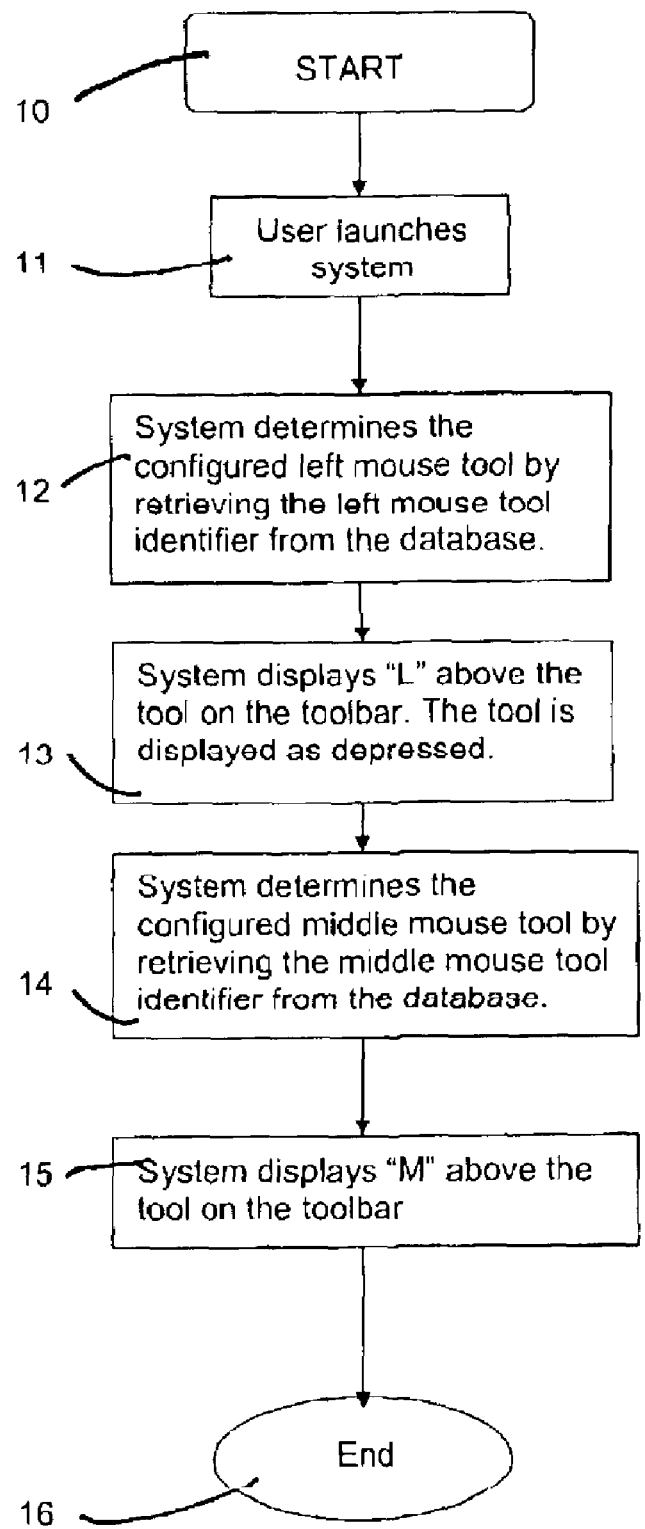
FIG. 1 is a flow diagram describing the user interaction of the method of the present invention.

As shown in FIG. 1 and by way of example, when a user launches an application 11 from the start menu 10 and brings up a tool bar, the system retrieves the configured left mouse identifier 12 from the database associated with the particular program and displays the label "L" above the tool on the toolbar 13. Similarly, the system retrieves the configured middle mouse tool identifier 14 and displays the label "M" above the tool on the toolbar 15 and the method of the present invention ends 16.

Figure 2:
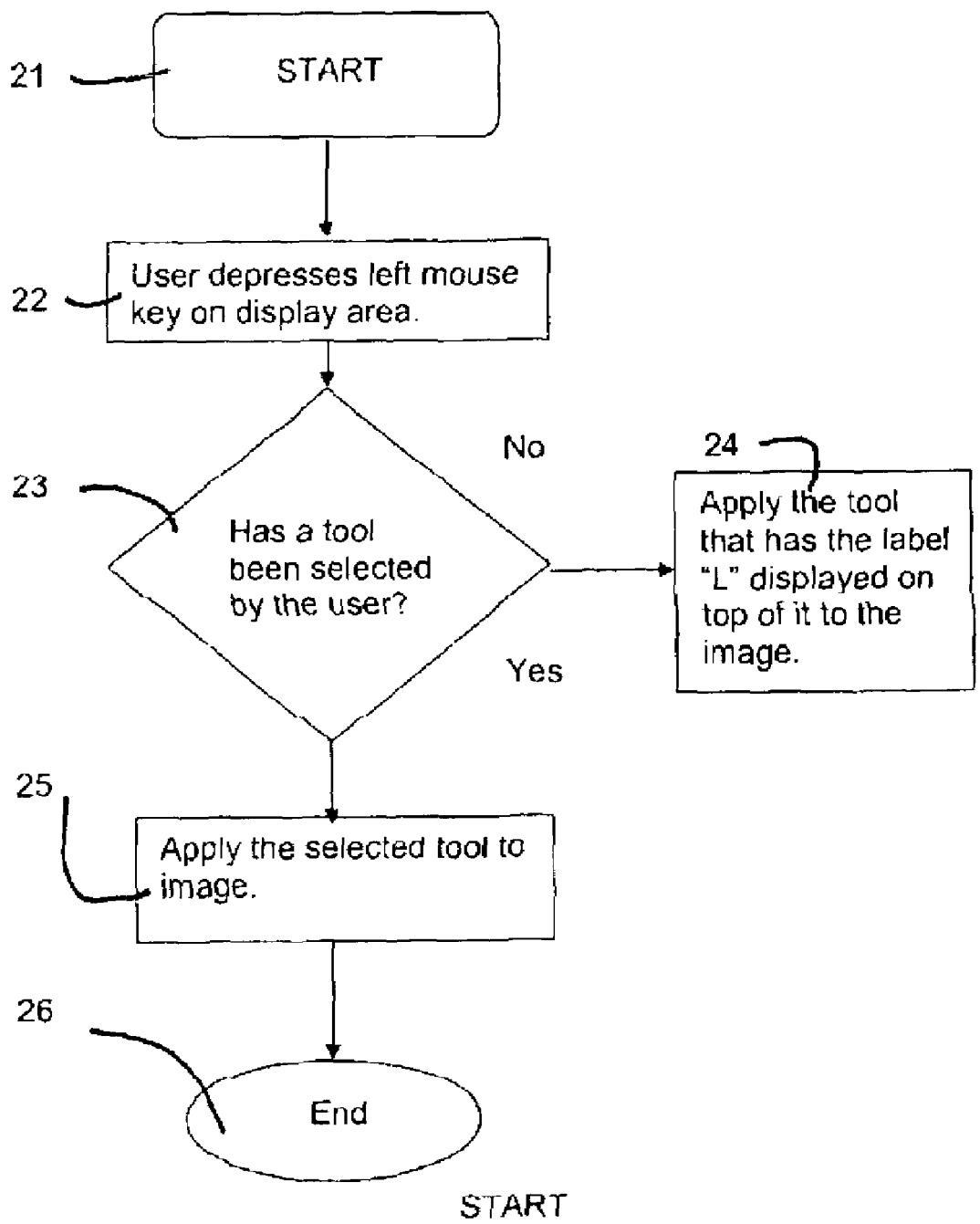
FIG. 2 is a flow diagram describing the method of the present invention as a user would employ the left mouse key.
Figure 3:
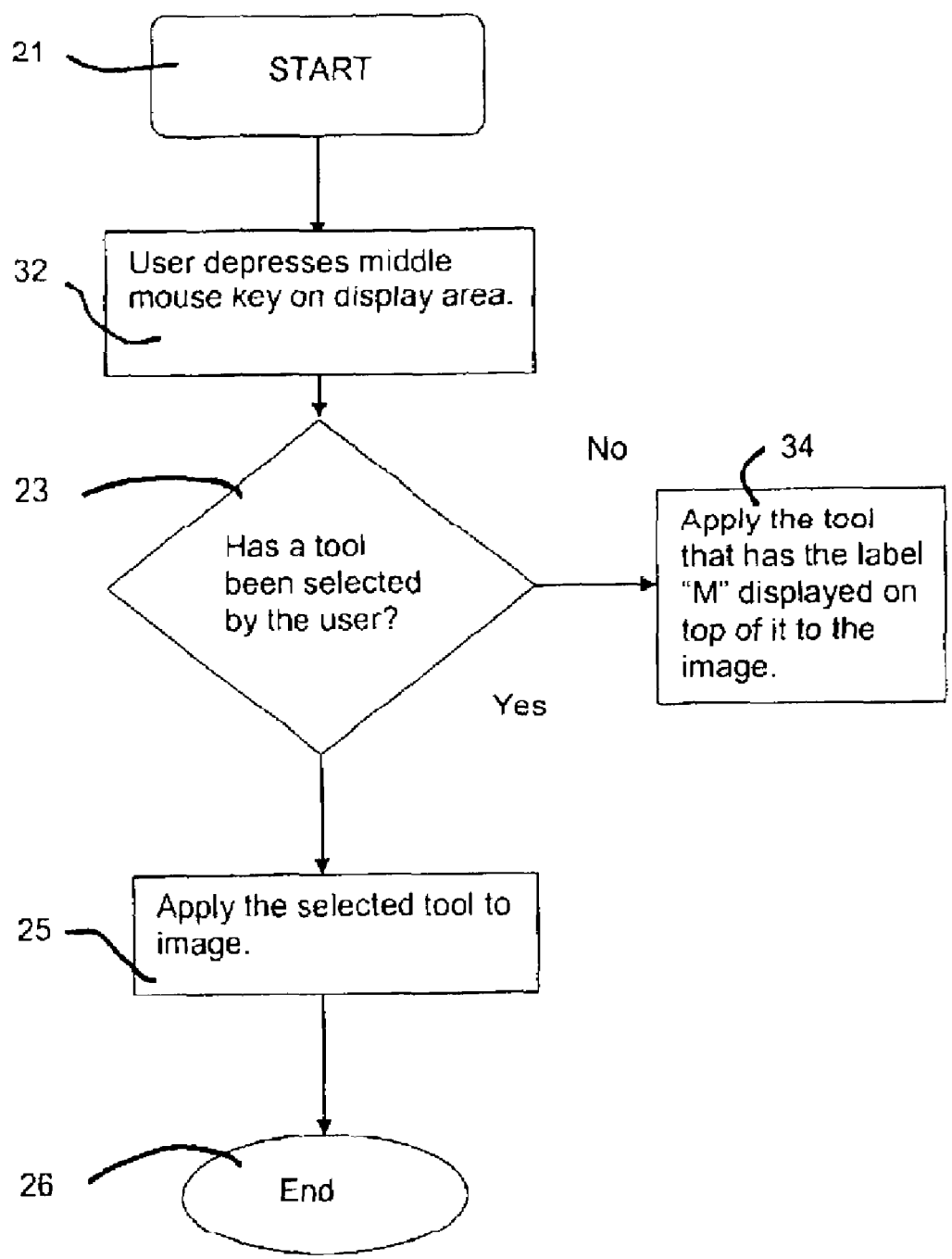
FIG. 3 is a flow diagram describing the method of the present invention as a user would employ the middle mouse key.
Figure 6:
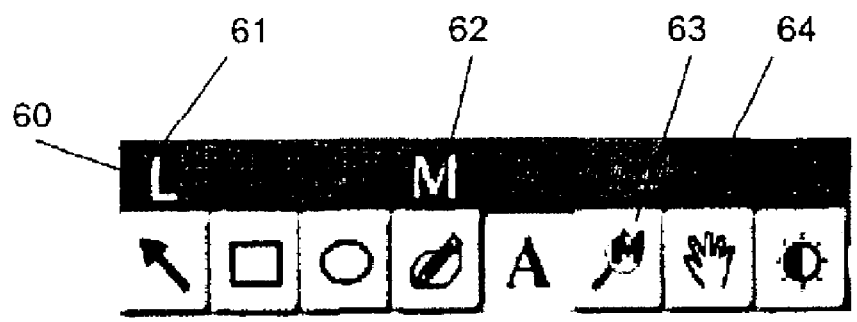
FIG. 6 is an example of a tool bar used in the method of the present invention that supports default left and middle mouse configuration.

As shown in FIG. 2 and in FIG. 3, the user starts 21 the process of changing tool functionality by depressing the left or middle mouse key on the display 22,32. The database then identifies whether a tool 23 has been selected and issues an error warning 24,34 if no tool was selected or permits the user to drag the L or the M located above the toolbar 25, 35. The user then drags the label using the left mouse key and to drops the label L or M onto a tool of the user's selection. The database then updates the screen and displays an L or an M over the appropriate tool and makes the correct association within the program. The method of the present invention then ends 26. A sample toolbar 60 having a plurality of tools 64 that supports the left 61 and middle 62 mouse configuration of the present invention is shown in FIG. 6.

The user may also drag the left mouse key on the displayed view area. In this case the viewport would identify the function associated with the left mouse key from the database and apply the tool. For example, if the selected tool is zoom in, the image would be magnified base on the amount of the mouse drag. The same procedure works for the tool that has been assigned to the middle mouse key. A convenient counterfunction would be to associate the middle mouse key with the zoom out function. Then if the operator zoomed in too far, the operator could simply depress the middle mouse key to zoom out.

Figure 4:
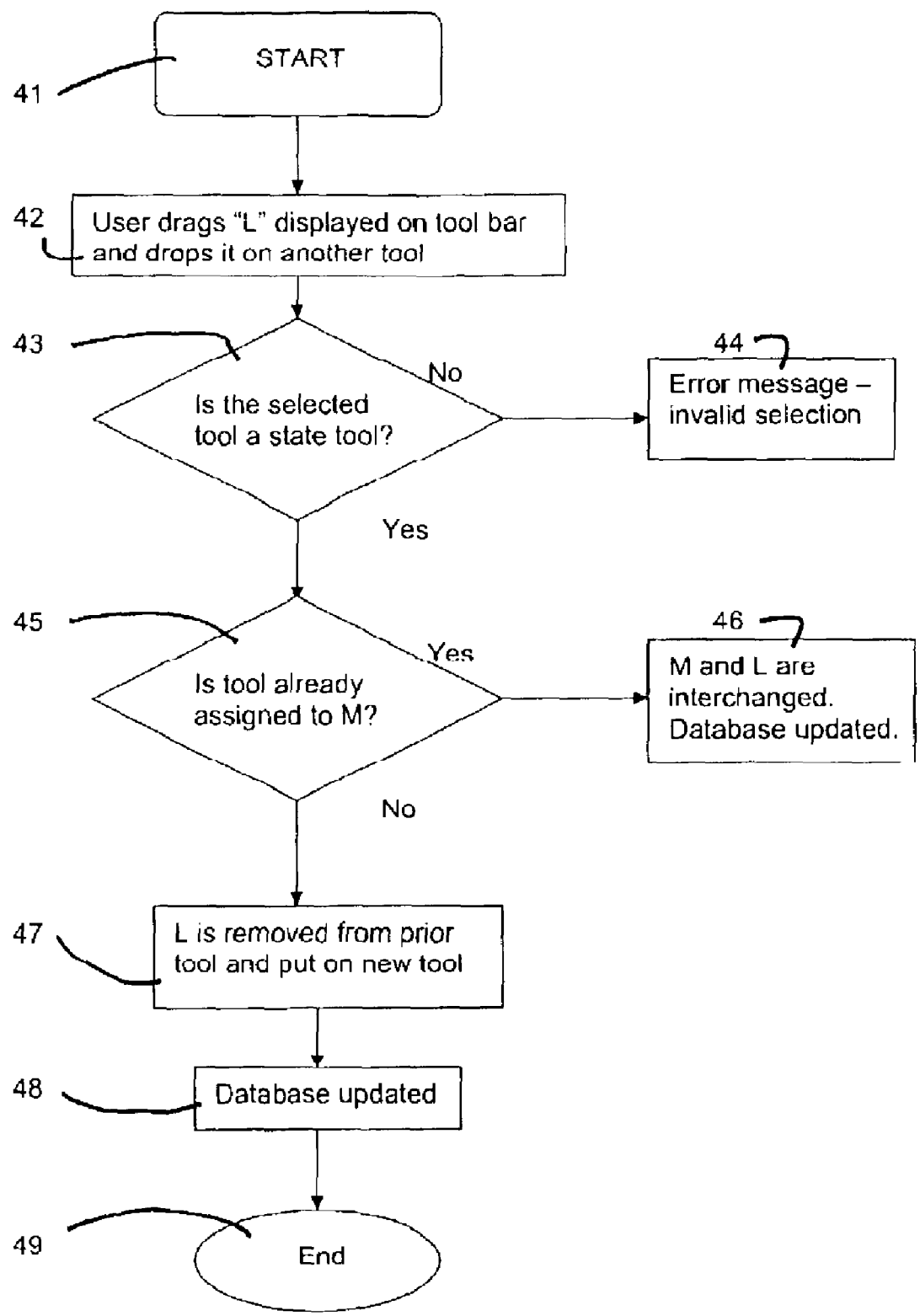
FIG. 4 is a flow diagram describing the user interaction with the method of the present invention when the function of the left mouse key is changed.
Figure 5:
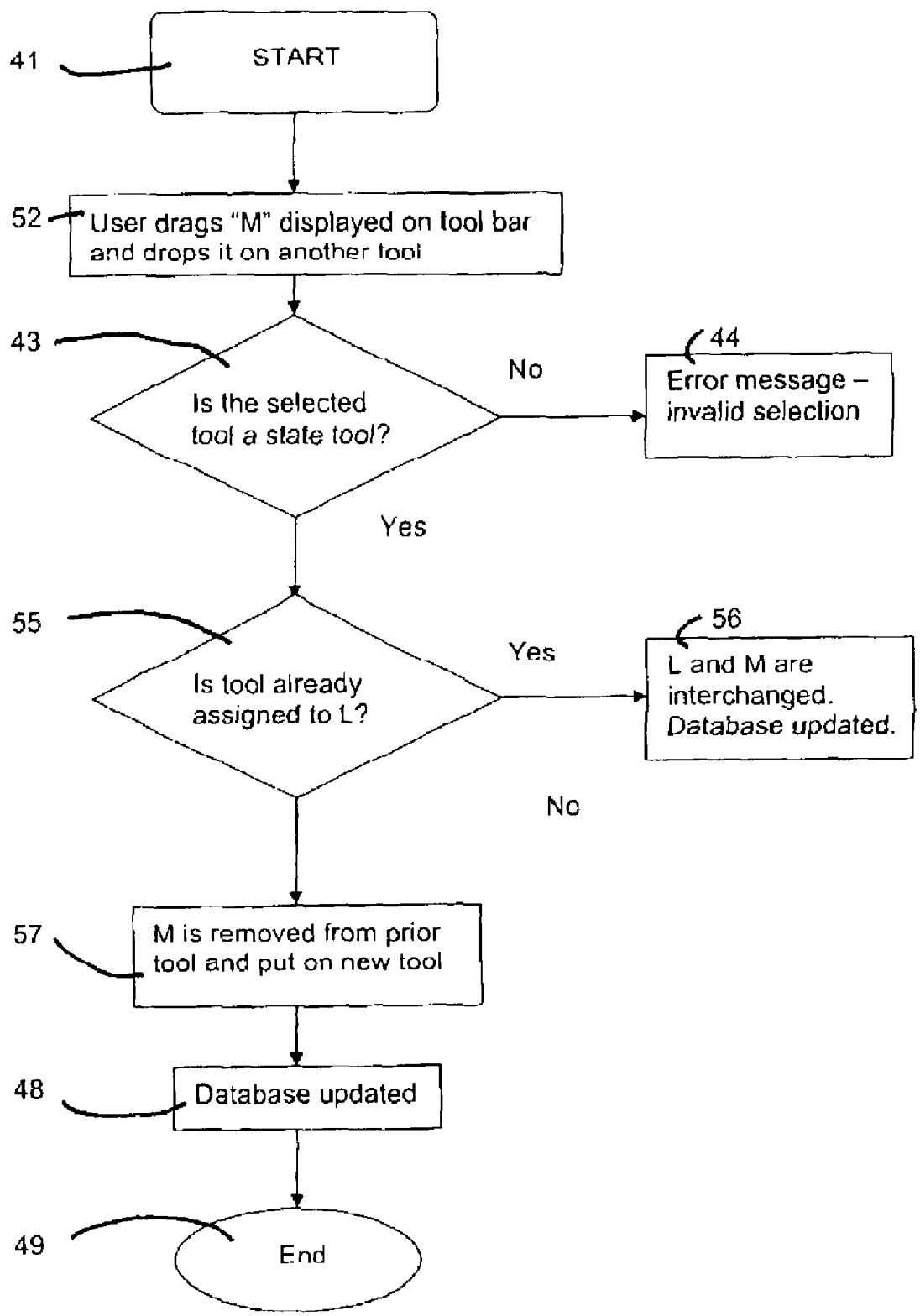
FIG. 5 is a flow diagram describing the user interaction with the method of the present invention when the function of the middle mouse key is changed.

The user may also wish to redesignate the functionality associated with one of the mouse keys. The procedure for changing the association of one of the keys is shown in FIG. 4 and FIG. 5. First, the user starts 41 by selecting the "L" or "M" and dragging the "L" or "M" on the tool bar to another tool 42, 52. The system will then check the database to see if the tool on which the label was dropped is an action tool 43. If the tool selected is an action tool, the system will display an error message 44. If not, the database will be checked to see if the tool has already been designated by the label "M" or "L" 45,55. If it has, the "M" will be replaced by an "L" or the opposite 46, 56. If the tool is a state tool and does not have the label "M" displayed above it, the label "L" is removed from the current location and moved to the top of the new tool 47, 57. Lastly, the database is updated 48 with the new values of the left and middle mouse tool and the method ends 49. The same procedure is followed if the user wishes to change the functionality associated with the middle mouse key "M".

Figure 7:
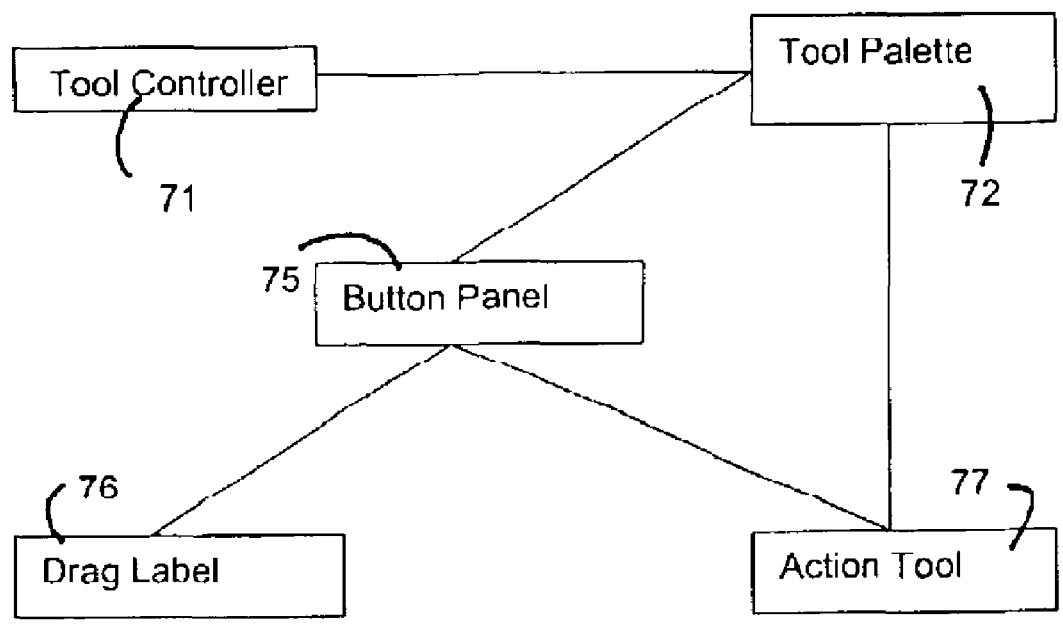
FIG. 7 is a schematic of the static design of the present invention.

FIG. 7 is schematic showing the static design of the present invention. The Tool Controller 71 handles all mouse events. Basically, it translates mouse events, such as clicking a mouse button, to the functionality the mouse button is associated with. The Tool Palette 72 is simply the container for all of the tools. The Draglabel 76 represents the label displayed above the configured left and middle mouse tool on the toolbar. The Picture Checkbox 78 represents the class of state tools. The Action Tool 77 represents the class of action tools.

Figure 8:
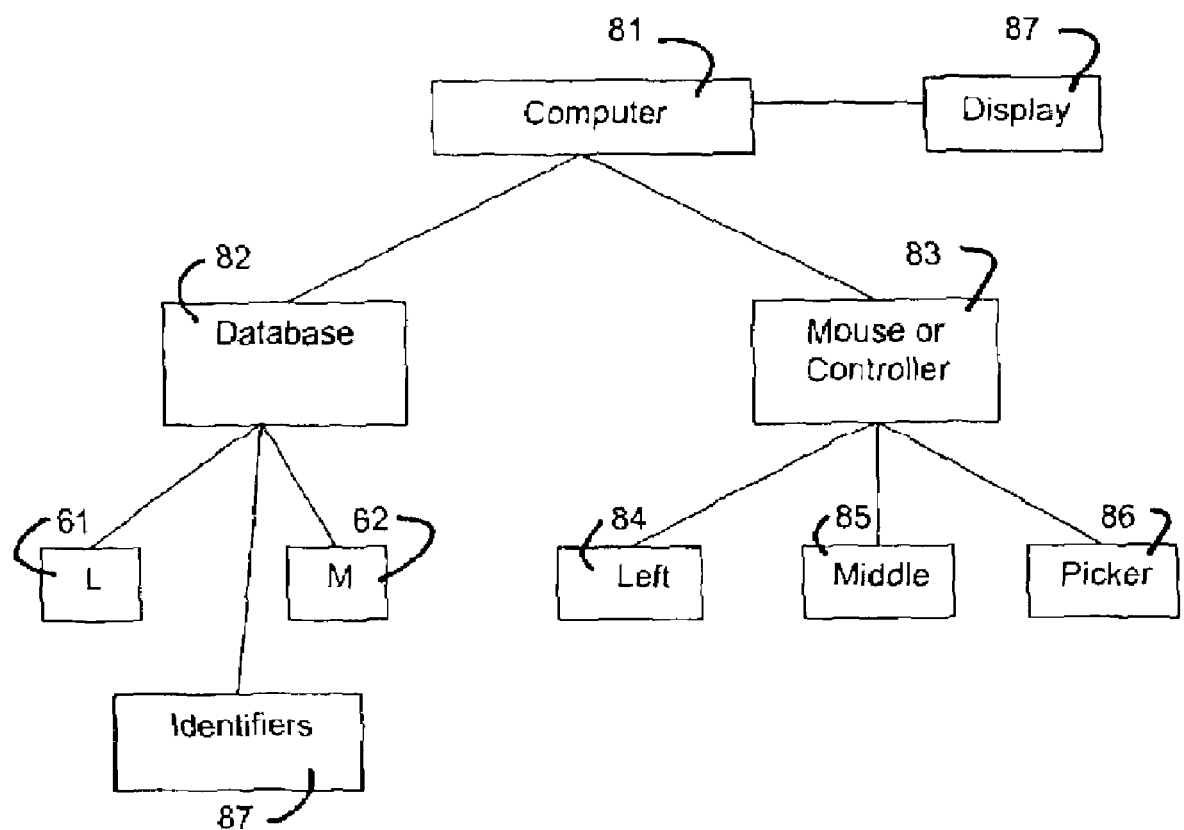
FIG. 8 is a schematic of the static design of the computer, display, database and controller.

FIG. 8 is a schematic showing the interaction of the computer 81, the display 87 to viewer and the database 82. The database 82 contains an "L" 61 and an "M" 62 identifier that corresponds to the symbols on the display screen 87 as well as identifiers 87 for each tool 63. The mouse, or controller 83 is also depicted in FIG. 7 having three buttons, or keys, 84, 85, 86.

Obviously, the method of the present invention does not require the specific use of a mouse. As is generally known in the are, there are all manner of controllers on laptops and for use with desktops that could be used with the present invention. The examples provided using a mouse are intended to illustrate the invention and not to limit the invention.

Accordingly, a new device that permits to user to assign two different functionalities with two different mouse buttons at the same time. The device of the present invention further provides a method for configuring a toolbar such that only one input is required to change the functionality associated with a mouse key.

Although we have very specifically described the preferred embodiments of the invention herein, it is to be understood that changes can be made to the improvements disclosed without departing from the scope of the invention. Therefore, it is to be understood that the scope of the invention is not to be overly limited by the specification and the drawings, but is to be determined by the broadest possible interpretation of the claims.

What is claimed is:

1. A method for assigning tools in a toolbar of a software program to the left and middle mouse keys comprising the steps of:
   providing a toolbar having a plurality of tools on a display:
   assigning each of said plurality of tools an identifier that uniquely identifies the tool;
   providing a mouse having at least a plurality of keys;
   assigning each of said keys to one of said plurality of tools on the toolbar; and
   permitting a user to reassign the tool associated with the plurality of keys.

2. The method of claim 1 wherein each of said plurality of tools is assigned a unique integer as an identifier.

3. The method of claim 2 wherein the mouse has three keys, a picker, a middle mouse key and a left mouse key.

4. The method of claim 3 wherein the toolbar identifies the tool associated with the left mouse key with an 'L' and the tool associated with the middle mouse key with an 'M'.

5. The method of claim 4 wherein a user is permitted to assign either no tools with the mouse keys, one tool with either the middle mouse key or the left mouse key or a tool with the middle mouse key and a tool with the left mouse key.

6. The method of claim 5 wherein a user is permitted to reassign the tool associated with a mouse key by clicking on the identifier near the current tool and moving the identifier into a position near the desired tool.

7. A method for providing two different functionalities with two different mouse keys comprising the steps of:
   providing a computer having a database;
   launching an application;
   opening a toolbar in the application;
   providing a toolbar with a plurality of tools;
   providing an identifier that uniquely identifies each tool in the toolbar and storing the identifier in the database;
   providing an identifier for the left and middle mouse keys and storing the identifiers in the database;
   assigning the left mouse key to one of the plurality of tools;
   assigning the middle mouse key to one of the plurality of tools;
   permitting a user to reassign the left mouse key, the middle mouse key, or both to a different tool on the toolbar.

8. The method of claim 7 wherein each of said plurality of tools is assigned a unique integer as an identifier.

9. The method of claim 8 wherein the mouse has three keys, a picker, a middle mouse key and a left mouse key.

10. The method of claim 9 wherein the toolbar identifies the tool associated with the left mouse key with an 'L' and the tool associated with the middle mouse key with an 'M'.

11. The method of claim 10 wherein a user is permitted to assign either no tools with the mouse keys, one tool with either the middle mouse key or the left mouse key or a tool with the middle mouse key and a tool with the left mouse key.

12. The method of claim 11 wherein a user is permitted to reassign the tool associated with a mouse key by clicking on the indicator near the current tool and moving the indicator into a position near the desired tool.

13. A method for providing two different functionalities with two different mouse keys comprising the steps of:
   providing a computer having a database;
   providing a toolbar with a plurality of tools;
   providing an identifier that uniquely identifies each tool in the toolbar and storing the identifier in the database;
   providing an identifier L for the left mouse key;
   providing an identifier M for the middle mouse key;
   storing the identifiers in the database;
   displaying the identifier L near the tool associated with the L identifier; and
   displaying the identifier M near the tool associated with the M identifier;
   wherein a user is permitted to assign either no tools with the mouse keys, one tool with either the middle mouse key or the left mouse key or a tool with the middle mouse key and a tool with the left mouse key; and wherein a user is permitted to reassign the tool associated with a mouse key by clicking on the indicator near the current tool and moving the indicator into a position near the desired tool.

14. The method of claim 13 wherein a user can operate the tool associated with the left mouse key or the middle mouse key by depressing the key associated with the desired functionality and dragging the key over the view area.

15. A method for providing two different functionalities with two different mouse keys for use with a software program on a computer having at least a display screen and a mouse comprising the steps of:
   providing a toolbar with a plurality of tools;
   providing an identifier that uniquely identifies each tool in the toolbar and storing the identifier in the database;
   providing an identifier for the left mouse key and the middle mouse key;
   storing the identifiers for the left mouse key and the middle mouse key in the database;
   displaying the identifier L near the tool associated with the L identifier
   displaying the identifier M near the tool associated with the M identifier, and
   wherein a user is permitted to assign a new functionality to a particular mouse key by dragging the L or M identifier to a new location on the toolbar.

16. The method of claim 15 wherein a user can operate the tool associated with the left mouse key or the middle mouse key by depressing the key associated with the desired functionality and dragging the key over the view area.

17. The method of claim 16 wherein a user is permitted to assign tools associated with different toolbars to either the left or the middle mouse key without regard to whether they are on the same toolbar.

18. A method for displaying a toolbar comprising the steps of:
   providing a toolbar having a plurality of tools, each tool having a particular symbol associated with said tool;
   providing a database;
   providing an identifier that uniquely identifies each tool in the toolbar and storing the identifier in the database;
   providing a space on the toolbar;
   providing an identifier "L" for the left mouse key in the space on the toolbar;
   providing an identifier "M" for the middle mouse key in the space on the toolbar and
   permitting a user to assign either no tools with the mouse keys, one tool with either the left mouse key or the middle mouse key a tool with the middle mouse key and a different tool with the left mouse key.

19. The method of claim 18 wherein a user is permitted to assign tools associated with different toolbars to either the left mouse key or middle mouse key without regard to whether they are on the same toolbar.

20. The method of claim 19 wherein a user is permitted to reassign the tool associated with a mouse key by clicking on the indicator near the current tool and moving the indicator into a position near the desired tool.

* * * * *